United States Patent
Gurvich et al.

(10) Patent No.: US 11,773,896 B2
(45) Date of Patent: Oct. 3, 2023

(54) COMPOSITE DRIVE SHAFT UNDER DOMINANT UNIDIRECTIONAL TORQUE

(71) Applicant: Hamilton Sundstrand Corporation, Charlotte, NC (US)

(72) Inventors: Mark R. Gurvich, Middletown, CT (US); Brayton Reed, Rome, NY (US); Joyel M. Schaefer, Earlville, NY (US); Michael King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 959 days.

(21) Appl. No.: 16/518,418

(22) Filed: Jul. 22, 2019

(65) Prior Publication Data

US 2021/0025441 A1 Jan. 28, 2021

(51) Int. Cl.
*F16C 3/02* (2006.01)
*B29C 70/20* (2006.01)
*B29L 31/00* (2006.01)

(52) U.S. Cl.
CPC ............ *F16C 3/026* (2013.01); *B29C 70/202* (2013.01); *B29L 2031/75* (2013.01)

(58) Field of Classification Search
CPC .. F16C 3/026; F16C 3/02; F16C 3/203; F16C 7/026; F16C 3/023; B29C 70/202; B29C 70/205; B29C 70/207; B29C 70/222; B29C 7/08; B29C 7/202; B29C 7/205; B29C 7/207; B29C 7/222; B29L 2031/75
USPC .................................. 464/181, 183
See application file for complete search history.

(56) References Cited

U.S. PATENT DOCUMENTS

| 3,651,661 A | | 3/1972 | Darrow | |
|---|---|---|---|---|
| 3,691,000 A | * | 9/1972 | Kalnin | B29C 70/08 428/116 |
| 4,089,190 A | * | 5/1978 | Worgan | F16C 3/026 464/181 |
| 4,157,181 A | * | 6/1979 | Cecka | B29C 70/207 473/319 |
| 4,186,696 A | * | 2/1980 | Linsenmann | F02F 7/0085 464/183 |
| 4,238,539 A | | 12/1980 | Presta et al. | |
| 4,248,062 A | * | 2/1981 | McLain | B29C 70/86 156/149 |
| 4,259,382 A | * | 3/1981 | Schwan | B29C 70/86 464/181 |

(Continued)

FOREIGN PATENT DOCUMENTS

| EP | 0145810 A1 * | 6/1985 | ............. F16C 3/026 |
|---|---|---|---|
| EP | 0174295 A2 * | 3/1986 | ........... B29C 70/207 |

(Continued)

OTHER PUBLICATIONS

Extended European Search Report for EP Application No. 19213132.4, dated Jul. 20, 2020, 12 pages.

(Continued)

*Primary Examiner* — Josh Skroupa
(74) *Attorney, Agent, or Firm* — Kinney & Lange, P.A.

(57) ABSTRACT

A drive shaft extending along a central axis is configured to operate under dominant unidirectional torsional load. The drive shaft has an asymmetrically-structured composite body which is configured to have a greater torque-carrying capability in a first torsional direction than in a second torsional direction that is opposite the first torsional direction.

16 Claims, 3 Drawing Sheets

(56) References Cited

U.S. PATENT DOCUMENTS

| | | | | |
|---|---|---|---|---|
| 4,716,072 | A | * | 12/1987 | Kim ..................... B29C 70/086 442/16 |
| 4,863,416 | A | | 9/1989 | Gupta |
| 4,927,684 | A | * | 5/1990 | Asensio ................. B29C 70/08 442/244 |
| 5,348,096 | A | | 9/1994 | Williams |
| 5,425,675 | A | * | 6/1995 | Pfeifer .................... F16F 15/10 464/183 |
| 6,464,591 | B1 | * | 10/2002 | Nakajima ............... B32B 27/08 138/143 |
| 8,246,478 | B2 | * | 8/2012 | Schreiber ................ F16C 3/026 464/181 |
| 8,904,904 | B2 | * | 12/2014 | Stewart ................... F16C 7/026 74/579 R |
| 10,464,656 | B2 | * | 11/2019 | Stewart ................... F16C 7/026 |
| 10,527,086 | B2 | * | 1/2020 | Bernard ................... F16C 3/026 |
| 10,730,246 | B2 | * | 8/2020 | Iwata ..................... B29C 70/207 |
| 2010/0113170 | A1 | * | 5/2010 | Schreiber ................ F01D 5/02 464/181 |
| 2013/0000767 | A1 | * | 1/2013 | Nonaka ................. B29C 70/222 156/123 |
| 2015/0053293 | A1 | * | 2/2015 | Ophaug .................. F16L 9/123 138/140 |
| 2017/0122395 | A1 | | 5/2017 | Kiele et al. |
| 2017/0274603 | A1 | * | 9/2017 | Iwata ...................... B32B 27/12 |
| 2018/0222128 | A1 | * | 8/2018 | Tomioka ................. B29B 15/08 |
| 2018/0335077 | A1 | * | 11/2018 | Oessenich .............. F16C 3/026 |
| 2019/0186656 | A1 | * | 6/2019 | Kozak ................... B29C 70/222 |

FOREIGN PATENT DOCUMENTS

| | | | | |
|---|---|---|---|---|
| EP | 1458554 | A1 | | 9/2004 |
| GB | 2026651 | A | * | 2/1980 ............. F16C 3/026 |
| GB | 2070193 | A | * | 9/1981 ............. F16C 3/026 |
| GB | 2231637 | A | | 11/1990 |
| JP | 63199915 | A | * | 8/1988 ............. F16C 3/026 |
| WO | WO-8002186 | A1 | * | 10/1980 ............. F16C 3/026 |
| WO | WO-03037608 | A1 | * | 5/2003 ............. B29C 70/32 |

OTHER PUBLICATIONS

Ulken et al., "Die Anwendung in Schiffsantriebsanlagen", Schiff Und Hafen, Seehafen Verlag GmbH, DE, vol. 51, No. 10, Oct. 1, 1999, 7 pages.

Communication Pursuant to Article 94(3) EPC for EP Application No. 19213132.4, dated Apr. 4, 2022, 4 pages.

Communication Pursuant to Article 94(3) EPC for EP Application No. 19213132.4, dated Dec. 16, 2022, 5 pages.

* cited by examiner

COMPOSITE DRIVE SHAFT UNDER DOMINANT UNIDIRECTIONAL TORQUE

BACKGROUND

The present invention relates generally to composite shafts, and more particularly, to drive shafts used for load transfer.

Torsional load is usually the primary load component applied to drive shafts. Certain applications of shafts, such as, for example, in helicopters, cause them to experience torque primarily in one direction. Torque generates in-plane shear stresses in the shaft walls, which can be decoupled into tensile stresses in one direction and compressive stresses in another direction. Conventional composite drive shafts have symmetrical layups that are consequently often heavily loaded with respect to one stress path (e.g., compression), and under-loaded with respect to another (e.g., tensile) during ordinary operation. Under such conditions, composite drive shafts can be prone to failures primarily along compressive or tensile load paths, depending on the material properties of the composite shaft itself.

SUMMARY

A drive shaft extends along a central axis and is configured to operate under dominant unidirectional torsional load. The drive shaft comprises an asymmetrically-structured composite body. The asymmetrically-structured composite body is configured to have a greater torque-carrying capability in a first torsional direction than in a second torsional direction opposite the first torsional direction.

Design of a composite drive shaft includes orienting a first plurality of layers in a first direction at a first angle with respect to a central axis of the drive shaft and orienting a second plurality of layers in a second direction that is different from the first direction at a second angle with respect to the central axis. The first plurality of layers provides a first total thickness and is comprised of a first plurality of fibers oriented in the first direction. The second plurality of layers provides a second total thickness and is comprised of a second plurality of fibers oriented in the second direction. The first plurality of fibers comprises more fibers than the second plurality of fibers. The first plurality of layers and the second plurality of layers are impregnated with a polymer matrix.

Figure 1A:
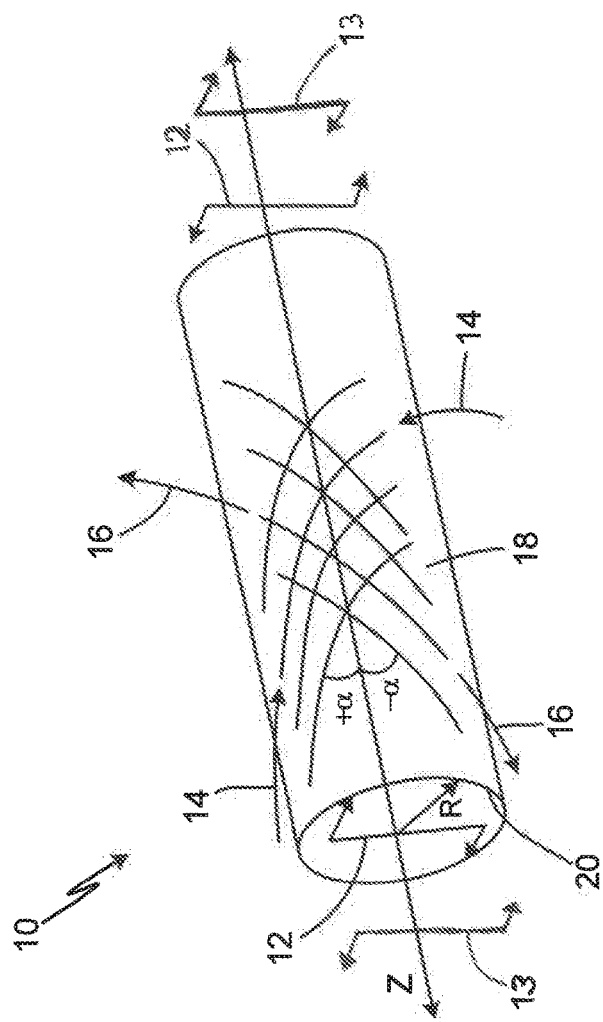
FIG. 1A is a perspective view of a composite drive shaft according to the present invention.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a composite drive shaft with an asymmetric fiber layup. Torsional load is a primary load component applied to drive shafts. This torsional load causes in-plane shear stresses in the walls of the shaft. These shear stresses can be decoupled into mutually orthogonal compressive stresses and tensile stresses. There is a broad class of drive shaft applications, for example, in rotorcraft, where orientation of the torque load is consistently applied in one orientation, i.e., these shafts are under a dominant unidirectional torque. For these applications, orientations of the compressive and tensile stresses are also consistent, and this understanding is used for drive shaft enhancement as described below.

In the case of a dominant unidirectional load, the design is driven by corresponding compressive stresses and tensile stresses and their paths or directions, respectively. Fiber-based composites generally have greater tensile strength than compressive strength along the fiber direction. Thus, if a composite drive shaft is consistently under a dominant unidirectional load, more fiber-reinforced layers can be placed in the compressive stress direction than in the tensile stress direction. This asymmetric design gives the shaft a greater torque-bearing capability in one torsional direction than in the opposite torsional direction, meaning that when the shaft is attached to a load, it will be able to bear a greater torsional load in one torsional direction about the central axis than in the opposite torsional direction. Because the shaft is under a dominant unidirectional load, it can be designed to suit this unidirectional load without also needing to bear a similar load in the opposite direction.

By placing more layers in the weakest orientation (for example, along the compressive stresses, if compression strength is lower than tensile strength) and less layers in the strongest orientation (for example, along the tensile stresses, if compression strength is lower than the tensile strength), the asymmetric design can unify the risks of the shaft's structural failures under both compressive and tensile stresses. Such an asymmetric design provides advantages over conventional symmetric designs where the numbers of fiber-reinforced layers in the compressive stress and tensile stress directions are equal. This asymmetric design increases the efficiency of the composite drive shaft through increased bearing ability and/or reduced weight.

FIG. 1A is a perspective view of composite drive shaft 10 aligned along central axis Z and radial line R, and experiencing dominant torque T in first torque direction 12 and second torque direction 13. Dominant torque T in first torque direction 12 and second torque direction 13 generates compressive stresses and tensile stresses along the length of composite drive shaft 10. These compressive stresses are oriented in a consistent alignment along the length of composite shaft 10, defined herein as compressive stress direction 14. The tensile stresses are similarly oriented in a consistent alignment along the length of composite shaft 10, defined herein as tensile stress direction 16. Compressive stress direction 14 can be oriented in a direction at an angle of +α=+45 degrees with respect to central axis Z. In other embodiments, the angle +α of compressive stress direction 14 can be oriented in a broader range around +45 degrees, for example, between +35 degrees and +55 degrees with respect to central axis Z. Tensile stress direction 16 can be oriented in a direction at an angle of −α=−45 degrees with respect to central axis Z. In other embodiments, the angle −α of tensile stress direction 16 can be oriented in a broader range around −45 degrees, for example between −35 degrees and −55 degrees with respect to central axis Z. It will be understood by one of ordinary skill in the art that the "+" orientation corresponds to compression and the "−" orientation corresponds to tension under the dominant unidirectional torsional load and that if torque is applied in an opposite direction, the orientations of compression and tension will be mutually shifted.

Figure 1C:
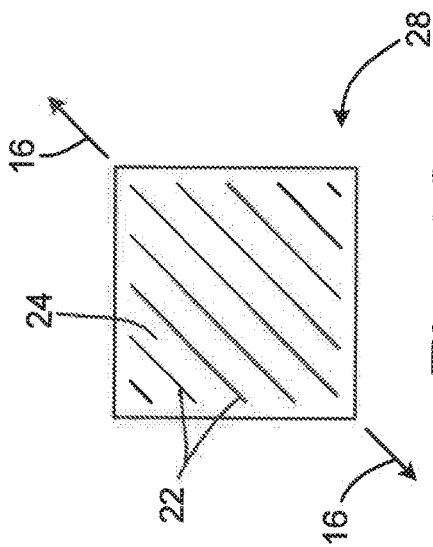
FIG. 1C illustrates a representative layer with fiber orientation along the tensile stress direction within the composite drive shaft of FIG. 1A.
Figure 1B:
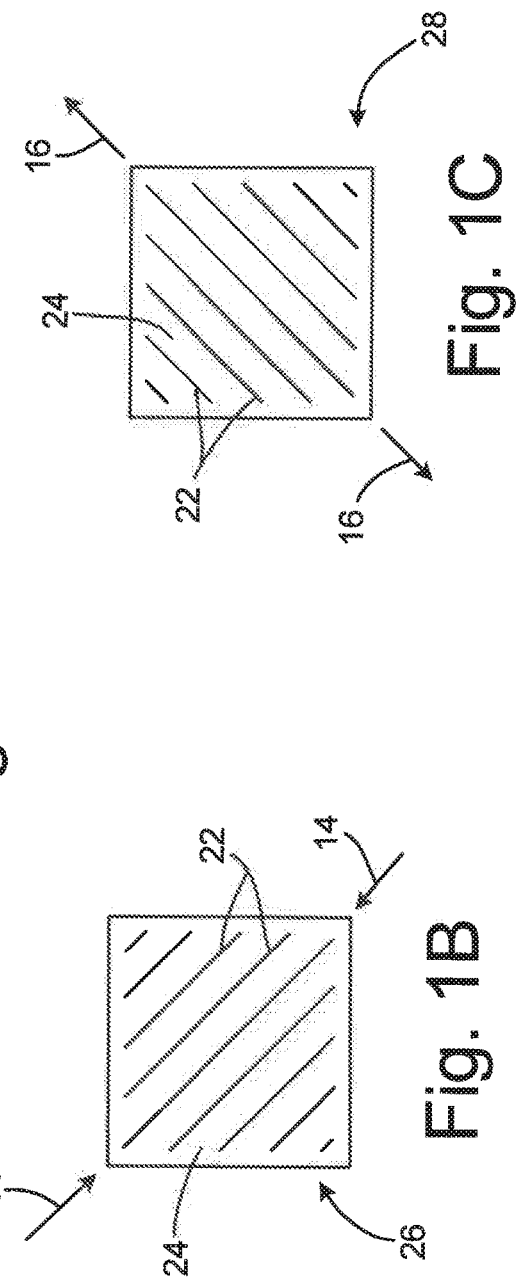
FIG. 1B illustrates a representative layer with fiber orientation along the compressive stress direction within the composite drive shaft of FIG. 1A.

In one embodiment, composite drive shaft 10 is comprised of composite material 18, which is made up of layers 20 of fibers 22 (shown in FIGS. 1B-1C) and polymer matrix 24 (shown in FIGS. 1B-1C). Layers 20 include a plurality of first layers 26 with fiber orientation along compressive stress direction 14 (fiber orientation shown in FIG. 1B) and a plurality of second layers 28 with fiber orientation along tensile stress direction 16 (fiber orientation shown in FIG. 1C). Fibers 22 can be impregnated with polymer matrix 24 so as to become embedded within it and form layers 20. Fibers 22 can be carbon fibers, glass fibers, organic fibers, or combinations thereof, or another suitable material as known in the art. Polymer matrix 24 can be a thermoset polymer, a thermoplastic polymer, or another suitable matrix material.

FIG. 1B illustrates representative first layer 26 with fiber orientation along compressive stress direction 14 within composite drive shaft 10 of FIG. 1A. In this embodiment, fibers 22 in each first layer 26 are oriented at +45 degrees with respect to central axis Z and arranged within polymer matrix 24.

FIG. 1C illustrates representative second layer 28 with fiber orientation along tensile stress direction 16 within composite drive shaft 10 of FIG. 1A. In this embodiment, fibers 22 in each second layer 28 are oriented at −45 degrees with respect to central axis Z and arranged within polymer matrix 24.

When composite drive shaft 10 experiences dominant torque T in first torque direction 12 and second torque direction 13, first layers 26 experience compressive stress $\sigma_c$ in compressive stress direction 14, and second layers 28 experience tensile stress $\sigma_t$ in first tensile stress direction 16. In fiber-based composites, fibers 22 are generally weaker under compressive stress $\sigma_c$ than under tensile stress $\sigma_t$. This causes first layers 26 to be weaker than second layers 28 in the case of symmetric composite layups, i.e., designs with equal number of first layers 26 and second layers 28. In the present invention, drive shaft efficiency is improved by providing different numbers of first layers 26 (with fibers substantially oriented along compression stress direction 14) and second layers 28 (with fibers substantially oriented along tensile stress direction 16) according to their strengths, respectively. The roles of first layers 26 and second layers 28 (i.e. compressive vs. tensile) would be flipped if first torque direction 12 and second torque direction 13 were reversed. Because the expected direction of dominant torque T is known, however, the present structure can produce aggregate strength sufficient to efficiently handle dominant torque T, without needing to also withstand stresses corresponding to the torque in the opposite direction.

Figure 2B:
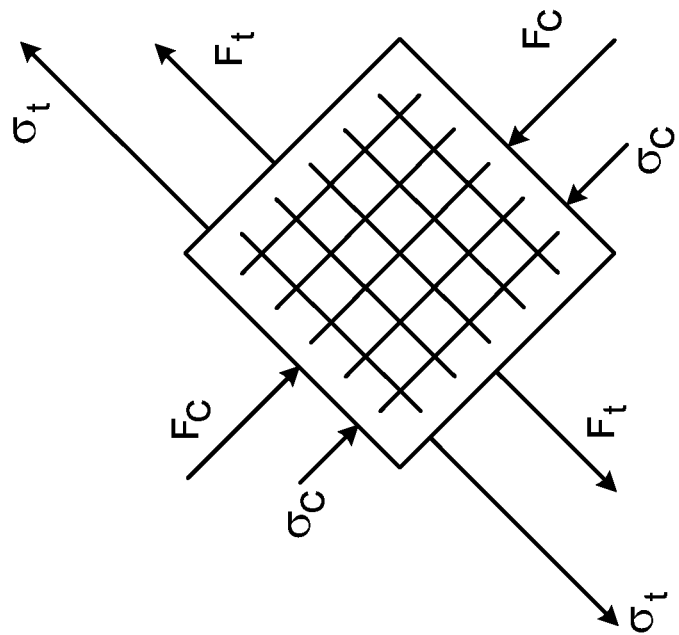
FIG. 2B is a schematic depiction of the compressive and tensile stresses and corresponding stress/strength ratios in the composite drive shaft of FIG. 1A having an asymmetric fiber layup.
Figure 2A:
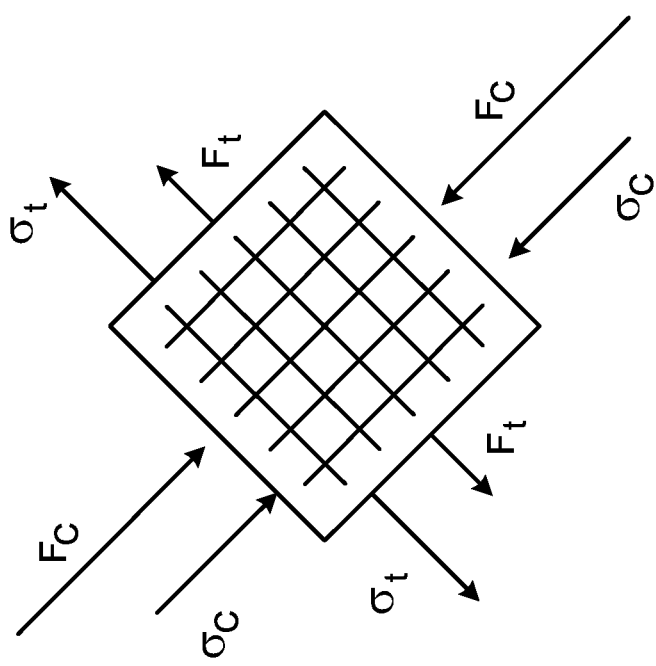
FIG. 2A is a schematic depiction of compressive and tensile stresses and corresponding stress/strength ratios in the composite drive shaft of FIG. 1A having a symmetric fiber layup.

FIGS. 2A and 2B schematically show stresses in the fiber directions, namely, compressive stresses, $\sigma_c$, and tensile stresses, $\sigma_t$, along with introduced values of failure susceptibility F. The failure susceptibility is defined as a ratio of a stress to a corresponding strength, i.e., as $F_c$ in case of layer-wise compressive strength $S_c$ and $F_t$ in case of layer-wise tensile strength $S_t$.

FIG. 2A schematically depicts stresses and failure susceptibility for a conventional symmetric design, where aggregate numbers of first layers 26 and second layers 28 are equal. In this case, stresses $\sigma_c$ and $\sigma_t$ are equal, but failure susceptibilities $F_c$ and $F_t$ are not equal, due to differences in compression and tensile strengths of layers 20. Therefore, for this conventional design, if compressive strength $S_c$ is lower than tensile strength $S_t$, compressive failure susceptibility $F_c$ is higher than tensile susceptibility $F_t$, making first layers 26 over-loaded and second layers 28 under-loaded.

FIG. 2B schematically depicts stresses and failure susceptibility for an asymmetric composite drive shaft design, where aggregate numbers of first layers 26 and second layers 28 are not equal. In this case, stresses $\sigma_c$ and $\sigma_t$ are not equal, but failure susceptibilities $F_c$ and $F_t$ are equal or almost equal. Therefore, for the asymmetric design, even if compressive strength $S_c$ is lower than the tensile strength $S_t$, compressive failure susceptibility $F_c$ and tensile susceptibility $F_t$ are practically the same, making risks of failure in first layers 26 and second layers 28 very close and ideally equal.

In FIG. 2B, compressive failure susceptibility $F_c$ in compressive stress direction 14 is equal to tensile failure susceptibility $F_t$ in tensile stress direction 16 because tensile stress $\sigma_t$ has been scaled up by a factor of tensile strength $S_t$ over compressive strength $S_c$. This can be accomplished by reducing the total number of second layers 28 with fibers oriented in tensile stress direction 16 and/or increasing the total number of first layers 26 with fibers oriented in compressive stress direction 14, such that either first layers 26 outnumber second layers 28, or the total thickness of first layers 26 is greater than the total thickness of second layers 28, by a factor of layer-wise tensile strength over layer-wise compressive strength. In other embodiments, the factor of outnumbering of first layers 26 in comparison with second layers 28 can be defined according to other potential failure mechanisms or their combinations. Among such failure mechanisms, for example, buckling of the shaft wall or buckling of individual layers due to interlaminar debonding can be considered in addition to the strength limits of layers in the fiber direction.

In some embodiments, the total number of first layers 26 is greater than the total number of second layers 28, or the total thickness of first layers 26 is greater than the total thickness of second layers 28 by a factor of at least 1.05. While discussed in terms of the number or thickness of first layers 26 and second layers 28, the increase or decrease in the number of first layers 26 and second layers 28 or total thickness of first layers 26 and second layers 28 represents an increase or decrease in the number of fibers oriented in compressive stress direction 14 and tensile stress direction 16. As such, the disclosed embodiments having more first layers 26 than second layers 28 or greater thickness of first layers 26 than thickness of second layers 28 have more fibers arranged in compressive stress direction 14 than are arranged in tensile stress direction 16.

Figure 3:
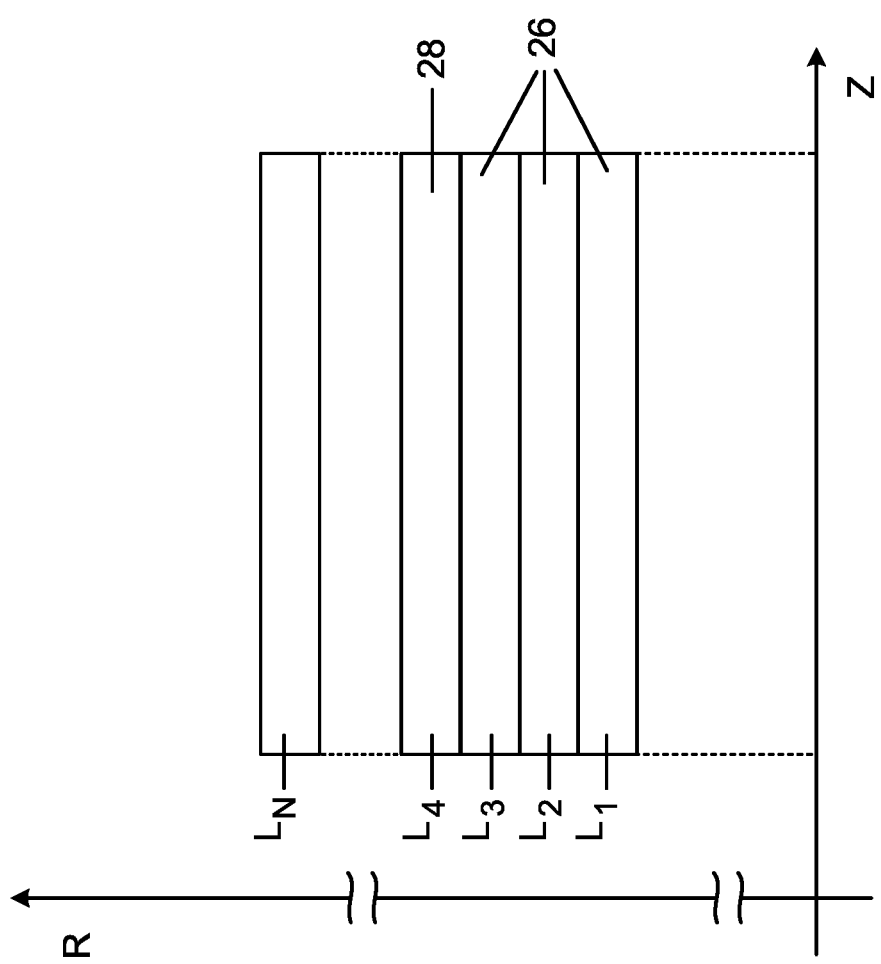
FIG. 3 is an enlarged axial cross-sectional representation of the layers making up the composite drive shaft taken along radial line R of FIG. 1A.

FIG. 3 is an enlarged axial cross-sectional representation of one embodiment of a composite drive shaft where layers $L_i$ (i=1, 2, 3, ..., N) make up composite drive shaft 10, taken along radial line R of FIG. 1A. Layers $L_i$ (i=1, 2, 3, ..., N) are comprised of fibers 22 and polymer matrix 24. Layers $L_i$ (i=1, 2, 3, ..., N) are a combination of first layers 26 and second layers 28. For a representative example shown in FIG. 3, layers $L_1$, $L_2$, and $L_3$ are first layers 26 with fiber orientation along compressive stress direction 14, and layer $L_4$ is second layer 28 with fiber orientation along tensile stress direction 16. First layers 26 experience compressive stress $\sigma_c$ in compressive stress direction 14, and second layers 28 experience tensile stress $\sigma_t$ in tensile stress direction 16.

Because first layers 26 with fibers oriented in compressive stress direction 14 are weaker than second layers 28 with fibers oriented in tensile stress direction 16, there is a greater number of first layers 26 than second layers 28. Decreasing the total number of second layers 28 increases tensile stress $\sigma_t$ on each individual second layer 28.

The arrangement of first layers 26 and second layers 28 within composite drive shaft 10 can be varied. For example, first layers 26 and second layers 28 could be arranged in a blocked design where some or all of first layers 26 are arranged together and some or all of second layers 28 are arranged together. Layers $L_1$-$L_4$ in FIG. 3 illustrate a simple blocked design where layers $L_1$, $L_2$, and $L_3$ are all first layers 26 with fibers arranged in compressive stress direction 14 and are arranged together separately from $L_4$, an individual second layer 28 with fibers arranged in tensile stress direction 16. Alternatively, second layers 28 could be interspersed within first layers 26 to create a pattern of alternating first layers 26 and second layers 28 or alternating blocks of first layers 26 and second layers 28. A person of ordinary skill in the art will recognize that designs having differing numbers and groupings of layers $L_i$ may be desirable and that varying designs can be used to achieve the same result of making the failure susceptibilities in compressive stress direction 14 and tensile stress direction 16 equal or nearly equal.

In addition to first layers 26 and second layers 28, with fibers oriented in compressive stress direction 14 and tensile stress direction 16, respectively, composite drive shaft 10 can include additional layers that are designed to handle other stresses within composite drive shaft 10 due to additional load components, such as for example, bending or/and axial loads, and/or potential failure mechanisms, such as for example, buckling of shaft walls. This can be done by, for example, orienting fibers 22 at 90 degrees to minimize the risk of buckling, or 0 degrees to limit stresses due to bending or axial loads. Additional layers can also be designed at other angles with respect to central axis Z. Additional layers in these alternative orientations can require that the angles of fibers 22 in first layers 26 and second layers 28 be adjusted to account for reinforcement provided by these additional layers.

A composite drive shaft under unidirectional torque has a load applied in a single known direction. Using an asymmetric layup allows the composite drive shaft to be tailored to differing compressive and tensile stresses it experiences in different directions. This increases the efficiency of the composite drive shaft at bearing expected loads, reducing the required mass by unifying the risks of the shaft's structural failure under both compressive and tensile stresses.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A drive shaft, among other possible things, includes an asymmetrically-structured composite body. The drive shaft extends along a central axis and is configured to operate under dominant unidirectional torsional load. The asymmetrically-structured composite body is configured to have a greater torque-carrying capability in a first torsional direction than in a second torsional direction that is opposite the first torsional direction.

The drive shaft of the preceding paragraph can optionally include, additionally and/or alternatively, any one or more of the following features, configurations, and/or components:

A further embodiment of the foregoing drive shaft, wherein the asymmetrically-structured composite body can include fibers oriented in a first direction at a first angle with respect to the central axis and fibers oriented in a second direction at a second angle with respect to the central axis. The first and second directions can be different, and the fibers can provide a greater torque-carrying capability in the first torsional direction than in the second torsional direction.

A further embodiment of any of the foregoing drive shafts, wherein there can be more fibers oriented in the first direction than in the second direction.

A further embodiment of any of the foregoing drive shafts, wherein the fibers can be embedded within a polymer matrix. The fibers can be arranged in layers that are either first layers, wherein the fibers can be oriented in the first direction at the first angle, or second layers, wherein the fibers can be oriented in the second direction at the second angle.

A further embodiment of any of the foregoing drive shafts, wherein a total number of first layers can be greater than a total number of second layers by at least a factor of 1.05.

A further embodiment of any of the foregoing drive shafts, wherein a total thickness of the first layers can be greater than a total thickness of the second layers by at least a factor of 1.05.

A further embodiment of any of the foregoing drive shafts, wherein the polymer matrix can be comprised of a thermoset polymer or a thermoplastic polymer.

A further embodiment of any of the foregoing drive shafts, wherein the fibers can be fibers selected from a group consisting of carbon fibers, glass fibers, organic fibers, and combinations thereof.

A further embodiment of any of the foregoing drive shafts, wherein the drive shaft can further include layers which are oriented in a third direction at a third angle with respect to the central axis. The third angle can be different than the first and second angles.

A further embodiment of any of the foregoing drive shafts, wherein fibers oriented in the first direction at the first angle can be substantially oriented in a compressive stress direction and fibers oriented in the second direction at the second angle can be substantially oriented in a tensile stress direction.

A further embodiment of any of the foregoing drive shafts, wherein the first angle can be oriented between +35 degrees and +55 degrees with respect to the central axis, and the second angle can be oriented between −35 degrees and −55 degrees with respect to the central axis.

A further embodiment of any of the foregoing drive shafts, wherein the first angle can be oriented +45 degrees with respect to the central axis, and the second angle can be oriented −45 degrees with respect to the central axis.

A method of manufacturing a drive shaft includes orienting layers in a first direction at a first angle with respect to a central axis of the drive shaft and orienting layers in a second direction that is different from the first direction at a second angle with respect to the central axis. Layers oriented in the first direction can provide a first total thickness and can include fibers oriented in the first direction. Layers oriented in the second direction can provide a second total thickness and can include fibers oriented in the second direction. There can be more fibers oriented in the first direction than in in the second direction. The layers can be impregnated with a polymer matrix.

The method of the preceding paragraph can optionally include, additionally and/or alternatively, any one or more of the following features, configurations, additional components, and/or steps:

A further embodiment of the foregoing method, wherein the layers oriented in the first direction can outnumber the layers oriented in the second direction, or the first total thickness can be greater than the second total thickness, by at least a factor of 1.05.

A further embodiment of any of the foregoing methods, wherein the polymer matrix can be comprised of a thermoset polymer or a thermoplastic polymer.

A further embodiment of any of the foregoing methods, wherein the fibers can be fibers selected from a group consisting of carbon fibers, glass fibers, organic fibers, and combinations thereof.

A further embodiment of any of the foregoing methods, which can include orienting layers in a third direction and at a third angle with respect to a central axis of the drive shaft. The third angle can be different than the first and second angles.

A further embodiment of any of the foregoing methods, wherein fibers oriented in the first direction at the first angle can be substantially oriented in a compressive stress direction and fibers oriented in the second direction at the second angle can be substantially oriented in a tensile stress direction.

A further embodiment of any of the foregoing methods, wherein the first angle can be oriented between +35 degrees and +55 degrees with respect to the central axis and the second angle can be oriented between −35 degrees and −55 degrees with respect to the central axis.

A further embodiment of any of the foregoing methods, wherein the first angle can be oriented +45 degrees with respect to the central axis and the second angle can be oriented −45 degrees with respect to the central axis.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A drive shaft extending along a central axis and being configured to operate under dominant unidirectional torsional load, the drive shaft comprising:
  an asymmetrically-structured composite body configured to have a greater torque-carrying capability in a first torsional direction than in a second torsional direction, the second torsional direction being opposite the first torsional direction; the asymmetrically-structured body comprising:
    a first plurality of fibers oriented in a first direction at a first angle with respect to the central axis, and embedded within a plurality of first polymer matrix layers, such that all fibers embedded in first polymer matrix layers are oriented substantially in the first direction; and
    a second plurality of fibers oriented in a second direction at a second angle with respect to the central axis, and embedded within a plurality of second polymer matrix layers separate from the plurality of first polymer matrix layers, such that all fibers embedded in second polymer matrix layers are oriented substantially in the second direction, and such that the first and second polymer matrix layers are radially stacked with respect to each other,
  wherein:
    the first and second directions are different,
    the first plurality of fibers is substantially oriented in a compressive stress direction and the second plurality of fibers is substantially oriented in a tensile stress direction;
    the first plurality of fibers and the second plurality of fibers provide a greater torque-carrying capability in the first torsional direction than in the second torsional direction, and
    the first polymer matrix layers outnumber the second polymer matrix layers by a factor of at least 1.05.

2. The drive shaft of claim 1, wherein the first plurality of fibers comprises more fibers than the second plurality of fibers.

3. The drive shaft of claim 1, wherein a total thickness of the plurality of first fiber matrix layers is greater than a total thickness of the plurality of second fiber matrix layers by at least a factor of 1.05.

4. The drive shaft of claim 1, wherein the polymer matrix comprises a thermoset polymer or a thermoplastic polymer.

5. The drive shaft of claim 1, wherein the first plurality of fibers and the second plurality of fibers comprise fibers selected from a group consisting of carbon fibers, glass fibers, organic fibers, and combinations thereof.

6. The drive shaft of claim 1, wherein the drive shaft further comprises a third plurality of fibers oriented in a third direction at a third angle with respect to the central axis different than the first and second angles.

7. The drive shaft of claim 1, wherein the first angle is oriented between +35 degrees and +55 degrees with respect to the central axis and the second angle is oriented between −35 degrees and −55 degrees with respect to the central axis.

8. The drive shaft of claim 7, wherein the first angle is oriented +45 degrees with respect to the central axis and the second angle is oriented −45 degrees with respect to the central axis.

9. The drive shaft of claim 1, wherein the first and second polymer matrix layers are arranged in an alternating pattern, with subsets of the second polymer matrix layers disposed between subsets of the first polymer matrix layers.

10. A method of manufacturing a composite drive shaft oriented along a central axis and being configured to operate under dominant unidirectional torsional load, the drive shaft having an asymmetrically-structured composite body configured to have a greater torque-carrying capability in a first torsional direction than in a second torsional direction, the second torsional direction being opposite the first torsional direction, the method comprising:
   orienting a first plurality of fibers in a first direction at a first angle with respect to the central axis, the first plurality of fibers being arranged in a first plurality of layers to provide a first total thickness;
   orienting a second plurality of fibers in a second direction that is different from the first direction and at a second angle with respect to the central axis, the second plurality of fibers being arranged in a second plurality of layers to provide a second total thickness;
   wherein all layers of the first and second pluralities of layers are separate from each other, wherein the layers of the first and second pluralities of layers are radially stacked with respect to each other, and wherein the first plurality of layers contain fibers oriented only at the first angle and the second plurality of layers contain fibers oriented only at the second angle;
   wherein the first plurality of fibers comprises more fibers than the second plurality of fibers;
   wherein the first plurality of fibers is substantially oriented in a compressive stress direction and the second plurality of fibers is substantially oriented in a tensile stress direction; and
   impregnating the first plurality of fibers and the second plurality of fibers with a polymer matrix.

11. The method of claim 10, wherein the first plurality of layers outnumbers the second plurality of layers by at least a factor of 1.05 or wherein the first total thickness is greater than the second total thickness by at least a factor of 1.05.

12. The method of claim 10, wherein the polymer matrix comprises a thermoset polymer or a thermoplastic polymer.

13. The method of claim 10, wherein both the first plurality of fibers and the second plurality of fibers are comprised of fibers selected from a group consisting of carbon fibers, glass fibers, organic fibers, and combinations thereof.

14. The method of claim 10, further comprised of orienting a third plurality of layers in a third direction at a third angle with respect to the central axis different than the first and second angles.

15. The method of claim 10, wherein the first angle is oriented between +35 degrees and +55 degrees with respect to the central axis and the second angle is oriented between −35 degrees and −55 degrees with respect to the central axis.

16. The method of claim 15, wherein the first angle is oriented +45 degrees with respect to the central axis and the second angle is oriented −45 degrees with respect to the central axis.

* * * * *